United States Patent Office 2,932,629
Patented Apr. 12, 1960

2,932,629

QUIESCENT SUSPENSION POLYMERIZATION

Ralph M. Wiley, Midland, Mich., assignor to The Dow Chemical Company, Midland, Mich., a corporation of Delaware No Drawing. Application March 28, 1955
Serial No. 497,449

6 Claims. (Cl. 260—91.5)

This invention concerns an improved method for carrying out the polymerization of polymerizable liquids while these are suspended in non-colloidal dispersion in non-solvent aqueous liquid media whereby spheroidal globules of polymer are readily obtained having a size larger than colloidal particles. It particularly concerns such a method whereby the polymer globules can readily be obtained in a substantially uniform and predetermined size from a suspension in an aqueous medium of very uniform and desired sized droplets of a polymerizable liquid. It relates especially to such a method in which a suspension of very uniform and desired sized droplets of a polymerizable liquid is obtained by first dispersing a polymerizable liquid by vigorous agitation into certain aqueous liquid suspending media and thereafter subjecting the dispersion to a condition of quiescence whereby a limited coalescence of the dispersed polymerizable liquid occurs with formation of a dispersion of a lesser number of larger, stable, uniform-sized droplets, the size of which depends in a predictable manner on the composition of the aqueous suspending medium.

The term "suspension polymerization" (also known as "granular," "bead," and "pearl" polymerization) refers to a well known kind of process in which a polymerizable liquid is subdivided and dispersed as droplets (but not as a colloidal emulsion) within a continuous aqueous liquid suspending medium and is polymerized while thus suspended. The process is distinguished from the so-called emulsion process principally in regard to the size of the particles of the dispersed phase. The dispersed particles made in the emulsion process have diameters usually in the order of from 0.1 to about 5 microns, i.e., from 0.00001 to about 0.0005 centimeter, whereas the diameters of suspension polymer globules are usually of the order of from about 0.01 to about 0.5 centimeter.

Methods for carrying out suspension polymerizations are already known. Usually there is employed an aqueous liquid suspending medium containing a "granulating" agent. The granulating agent may be one of the lyophilic colloids such as starch, natural gums, alginates, glycol cellulose, glue, gelatin or polyvinyl alcohol, or may be an insoluble fine powder of inorganic or organic nature. The proportion of such agent is carefully selected so that, with moderate stirring, a polymerizable liquid can be dispersed into the aqueous liquid without forming a stable colloidal emulsion of the dispersed monomer phase. The kind and degree of agitation in such processes are very critical and are related to the kind and proportion of granulating agent in determining the size of the dispersed liquid droplets. Vigorous agitation and/or large amounts of granulating agent tend to cause formation of small droplet dispersions while slow agitation and/or small proportions of granulating agent tend to cause formation of larger droplets. The droplets of the dispersed liquid are constantly in dynamic change during continued agitation as some droplets subdivide and other droplets coalesce. The dispersion is not stable and extensive coalescence of the liquid droplets occurs if agitation of the dispersion is stopped. The mixtures are usually agitated to maintain the polymerizing material as discrete droplets until the polymerization is substantially complete.

The nice balance between the composition of the dispersion and the degree of agitation that is required to maintain the droplets of the dispersed liquid in a desired size range makes control of such processes extremely difficult.

Some of the difficulties that are encountered are set forth as follows:

(1) The size of the droplets or globules obtained is mostly accidental and unpremeditated. Globules of a particular desired size can be obtained, if at all, only by experimentation and empirical trial and error.

(2) The sizes of globules obtained are usually random, often differing one from another by a factor of ten or more. While reasonably uniform-sized globules can sometimes be obtained by careful control as to the kind and degree of agitation, such ideal operation is often difficult to obtain and more difficult to reproduce, is very susceptible to changes in the composition of the charge and in the operating conditions, and must be empirically redetermined for every different charge composition and for every different scale of operation.

(3) As polymerization proceeds, the chemical and physical composition and properties of the droplets change and such changes often require corresponding changes in the composition of the suspending medium or in the operating procedure, e.g., change in the degree of agitation, in order to maintain the dispersion in the desired particle size range. The course of such changes is incremental and is difficult to predict.

(4) The polymer bead size often varies unpredictably from one run to another due to small variations in operating conditions and in charge composition.

(5) The procedure is difficult to change to a different scale. A carefully designed procedure on one scale of operation such as laboratory scale gives little basis for carrying out the operations on a different, e.g. a commercial, scale.

Illustrative of the empirical nature of such known procedures is the following description quoted from a patent publication on this subject matter.

"Accordingly, in order to obtain the product of this invention, we have found that stirring should be used in amount substantially equivalent to that obtained in an ovaled bottom enameled vessel containing no baffles having a capacity of 50 gallons and provided with a stirrer of a flat inverted T type (10″ x 1¾″) occupying 0.4 diameter of the pot and immersed 10 inches in the solution, the vessel having been charged with 25 gallons of water containing 0.3% of glycol cellulose and 5 gallons of monomeric methyl methacrylate, the stirrer being revolved at 510 r.p.m. and the solution maintained at a temperature of 82° C."

An object of this invention is to provide an improved method for preparing polymers in the form of beads having a predetermined and uniform size.

A particular object is to provide such a method by polymerization of a polymerizable liquid dispersed as droplets having a predetermined and uniform size and suspended in an aqueous liquid medium in which the dispersed droplets are stable as to size and shape.

Another object is to provide such a method that can be carried out substantially without agitation during the polymerization step.

Another object is to provide such a method wherein the size of the uniform droplets of polymerizable liquid is determined principally by the composition of the aqueous liquid suspending medium and is not critically dependent on the kind or degree of agitation employed to effect the preliminary dispersion.

Another object is to provide such a method that is readily controllable and reproducible.

A further object is to provide such a method that is readily carried out in different kinds of apparatus and on different scales of operation to give substantially reproducible results.

Other objects and advantages will be evident in the following description of the invention.

The objects of this invention are attained in a method, completely specified hereinafter, wherein (1) A polymerizable liquid is dispersed within a specially formulated aqueous non-solvent liquid medium to form a dispersion of droplets having sizes not larger than the size desired for the polymer globules, whereupon (2) The dispersion is allowed to rest and to reside with only mild or no agitation for a time during which a limited coalescence of the dispersed droplets takes place with the formation of a lesser number of larger droplets, such coalescence being limited due to the composition of the suspending medium, the size of the dispersed droplets thereby becoming remarkably uniform and of a desired magnitude, and (3) The uniform droplet dispersion is then stabilized by addition of thickening agents to the aqueous suspending medium, whereby the uniform-sized dispersed droplets are further protected against coalescence and are also prevented from concentrating in the dispersion due to difference in density of the disperse phase and continuous phase, and (4) The polymerizable liquid in such stabilized dispersion is subjected to polymerization conditions and polymerized, whereby globules of polymer are obtained having spheroidal shape and remarkably uniform and desired size, which size is predetermined principally by the composition of the initial aqueous liquid suspending medium.

The diameter of the droplets of polymerizable liquid, and hence the diameter of the beads of polymer, can be varied predictably, by deliberate variation of the composition of the aqueous liquid dispersion, within the range of from about 0.01 or less to about 0.5 centimeter. For any specific operation, the range of diameters of the droplets of liquid, and hence of polymer beads, has a factor in the order of three or less as contrasted to factors of ten or more for diameters of droplets and beads prepared by usual suspension polymerization methods employing critical agitation procedures. Since the bead size, e.g., diameter, in the present method is determined principally by the composition of the aqueous dispersion, the mechanical conditions, such as the degree of agitation, the size and design of the apparatus used, and the scale of operation, are not highly critical. Furthermore, by employing the same composition, the operations can be repeated, or the scale of operations can be changed, and substantially the same results can be obtained.

The present method is carried out by dispersing one part by volume of a polymerizable liquid into at least 0.5, preferably from 0.5 to about 10 or more, parts by volume of a non-solvent aqueous medium comprising water and at least the first of the following ingredients:

(1) A water-dispersible, water-insoluble solid colloid the particles of which in aqueous dispersion have dimensions in the order of from about 0.1 to about 50 microns, i.e., from about $10^{-5}$ to about $5 \times 10^{-3}$ centimeters, which particles tend to gather at the liquid-liquid interface or are caused to do so by the presence of (2) A water-soluble "promoter" that affects the "hydrophilic-hydrophobic balance" of the solid colloid particles; and/or (3) An electrolyte; and/or (4) Colloid-active modifiers such as peptizing agents, surface-active agents and the like; and, usually, (5) A water-soluble, monomer-insoluble inhibitor of polymerization.

The water-dispersible, water-insoluble solid colloids can be inorganic materials such as metal salts or hydroxides or clays, or can be organic materials such as raw starches, sulfonated crosslinked organic high polymers, resinous polymers and the like.

The solid colloidal material must be insoluble but dispersible in water and both insoluble and non-dispersible in, but wettable by, the polymerizable liquid. The solid colloids must be much more hydrophilic than oleophilic so as to remain dispersed wholly within the aqueous liquid. The solid colloids employed for limited coalescence are ones having particles that, in the aqueous liquid, retain a relatively rigid and discrete shape and size within the limits stated. The particles may be greatly swollen and extensively hydrated, provided that the swollen particle retains a definite shape, in which case the effective size is approximately that of the swollen particle. The particles can be essentially single molecules, as in the case of extremely high molecular weight crosslinked resins, or can be aggregates of many molecules. Materials that disperse in water to form true or colloidal solutions in which the particles have a size below the range stated or in which the particles are so diffuse as to lack a discernible shape and dimension are not suitable as stabilizers for limited coalescence. The amount of solid colloid that is employed is usually such as corresponds to from about 0.01 to about 10 or more grams per 100 cubic centimeters of the polymerizable liquid.

In order to function as a stabilizer for the limited coalescence of the polymerizable liquid droplets, it is essential that the solid colloid must tend to collect within the aqueous liquid at the liquid-liquid interface, i.e., on the surface of the oil droplets. (The term "oil" is occasionally used herein as generic to liquids that are insoluble in water.) In many instances, it is desirable to add a "promoter" material to the aqueous composition to drive the particles of the solid colloid to the liquid-liquid interface. This phenomenon is well known in the emulsion art, and is here applied to solid colloidal particles, as a means of adjusting the "hydrophilic-hydrophobic balance."

Usually, the promoters are organic materials that have an affinity for the solid colloid and also for the oil droplets and that are capable of making the solid colloid more oleophilic. The affinity for the oil surface is usually due to some organic portion of the promoter molecule while the affinity for the solid colloid is usually due to opposite electrical charges. For example, positively charged complex metal salts or hydroxides, such as aluminum hydroxide, can be promoted by the presence of negatively charged organic promoters such as water-soluble sulfonated polystyrenes, alginates and carboxymethylcellulose. Negatively charged colloids, such as bentonite, are promoted by positively charged promoters such as tetramethyl ammonium hydroxide or chloride or water-soluble complex resinous amine condensation products such as the water-soluble condensation products of diethanolamine and adipic acid, the water-soluble condensation products of ethylene oxide, urea and formaldehyde, and polyethylenimine. Amphoteric materials such as proteinaceous materials like gelatin, glue, casein, albumin, glutin and the like, are effective promoters for a wide variety of colloidal solids. Non-ionic materials like methoxycellulose are also effective in some instances. Usually, the promoter need be used only to the extent of a few parts per million of aqueous medium although larger proportions can often be tolerated. In some instances, ionic materials normally classed as emulsifiers, such as the soaps, long chain sulfates and sulfonates and the long chain quaternary ammonium compounds, can also be used as promoters for the solid colloids, but care must be taken to avoid thereby causing the formation of stable colloidal emulsions of the polymerizable liquid and the aqueous liquid medium.

An effect similar to that of organic promoters is often obtained with small amounts of electrolytes, e.g., water-soluble, ionizable alkalies, acids and salts, particularly those having polyvalent ions. These are especially useful when the excessive hydrophilic or insufficient oleophilic characteristic of the colloid is attributable to excessive hydration of the colloid structure. For example, a cross-linked sulfonated polymer of styrene is tremendously swollen and hydrated in water. Although the molecular structure contains benzene rings which should confer on the colloid some affinity for the oil phase in the dispersion, the great degree of hydration causes the colloidal particles to be enveloped in a cloud of associated water. The addition of a soluble, ionizable polyvalent cationic compound, such as an aluminum or calcium salt, to the aqueous composition causes extensive shrinking of the swollen colloid with exudation of a part of the associated water and exposure of the organic portion of the colloid particle, thereby making the colloid more oleophilic.

The solid colloidal particles whose hydrophilic-hydrophobic balance is such that the particles tend to gather in the aqueous phase at the oil-water interface, gather on the surface of the oil droplets and function as protective agents in the phenomenon of limited coalescence.

Other agents that can be employed in already known manner to effect modification of the colloidal properties of the aqueous composition are those materials known in the art as peptizing agents, flocculating and deflocculating agents, sensitizers, surface active agents and the like.

It is sometimes desirable to add to the aqueous liquid a few parts per million of a water-soluble, oil-insoluble inhibitor of polymerization effective to prevent the polymerization of monomer molecules that might diffuse into the aqueous liquid or that might be absorbed by colloid micelles and that, if allowed to polymerize in the aqueous phase, would tend to make emulsion-type polymer dispersions instead of, or in addition to, the desired bead or pearl polymers.

The aqueous medium containing the water-dispersible solid colloid is then admixed with the liquid polymerizable material in such a way as to disperse the liquid polymerizable material as small droplets within the aqueous medium. The dispersion can be accomplished by any usual means, e.g., by mechanical stirrers or shakers, by pumping through jets, by impingement, or by other procedure causing subdivision of the polymerizable material into droplets in a continuous aqueous medium.

The degree of dispersion, e.g., by agitation, is not critical except that the size of the dispersed liquid droplets must be no larger, and is preferably much smaller, than the stable droplet size expected and desired in the stable dispersion. When such condition has been attained, the resulting dispersion is allowed to rest with only mild, gentle movement, if any, and preferably without agitation. Under such quiescent conditions, the dispersed liquid phase undergoes a limited degree of coalescence.

"Limited coalescence" is a phenomenon wherein droplets of liquid dispersed in certain aqueous suspending media coalesce, with formation of a lesser number of larger droplets, until the growing droplets reach a certain critical and limiting size, whereupon coalescence substantially ceases. The resulting droplets of dispersed liquid, which can be as large as 0.3, and sometimes 0.5, centimeter in diameter, are quite stable as regards further coalescence and are remarkably uniform in size. If such a large droplet dispersion be vigorously agitated, the droplets are fragmented into smaller droplets. The fragmented droplets, upon quiescent standing, again coalesce to the same limited degree and form the same uniform-sized, large droplet, stable dispersion. Thus, a dispersion resulting from the limited coalescence comprises droplets of substantially uniform diameter that are stable in respect to further coalescence.

The principles underlying this phenomenon have now been adapted to cause the occurrence of limited coalescence in a deliberate and predictable manner in the preparation of dispersions of polymerizable liquids in the form of droplets of uniform and desired size.

In the phenomenon of limited coalescence, the small particles of solid colloid tends to collect with the aqueous liquid at the liquid-liquid interface, i.e., on the surface of the oil droplets. It is thought that droplets which are substantially covered by such solid colloid are stable to coalescence while droplets which are not so covered are not stable. In a given dispersion of a polymerizable liquid the total surface area of the droplets is a function of the total volume of the liquid and the diameter of the droplets. Similarly, the total surface area barely coverable by the solid colloid, e.g. in a layer one particle thick, is a function of the amount of the colloid and the dimensions of the particles thereof. In the dispersion as initially prepared, e.g., by agitation, the total surface area of the polymerizable liquid droplets is greater than can be covered by the solid colloid. Under quiescent conditions the unstable droplets begin to coalesce. The coalescence results in a decrease in the number of oil droplets and a decrease in the total surface area thereof up to a point at which the amount of colloidal solid is barely sufficient substantially to cover the total surface of the oil droplets, whereupon coalescence substantially ceases.

The limiting diameter of the stable oil droplets is directly proportional to the oil phase volume and is inversely proportional to the weight of colloid employed in the composition, according to the equation $$D = Q\frac{V}{w} \qquad \text{(Equation I)}$$

wherein D is the average diameter of the stabilized oil droplets (in centimeters), V is the volume of the oil in the composition (in cubic centimeters) and $w$ is the weight of the solid colloid (in grams, on dry basis) in the dispersion. Q is a constant whose value is characteristic of the particular colloid in a given aqueous medium. The value of Q can be expressed as follows:

$$Q = C\frac{dt}{k}$$

wherein $d$ is the dry density of the solid colloid particle (in grams per cubic centimeter), $t$ is the thickness of the colloid particle (in centimeters) in a direction normal to the surface of the oil droplet when the colloid particle is at the liquid-liquid interface, and $k$ is the swelling ratio of the colloid particle, i.e., the ratio of the wet volume of the particle in the aqueous dispersion to its dry volume. C is a constant whose value depends on the shape of the colloid particle and on the manner and degree of distribution of the colloid particles in the droplet surface. By substitution, Equation I becomes $$D = C\frac{dtV}{kw} \qquad \text{(Equation II)}$$

The value of the constant C in Equation II depends upon the geometry of the colloid layer on the droplet surface, i.e. the shape of the colloid particle, its orientation relative to the droplet surface and the order of arrangement of the colloid particles relative to each other. Most colloids can be characterized in regard to shape as belonging to one of the class spheres, flattened circular disks and rectangles (not necessarily as to the actual shape of the particles but in regard to their effective shape). The value of C may then be computed as follows (assuming a layer only one particle thick on the oil droplet surface):

For spheres, $C=\pi a$
For flattened circular disks, $C=\frac{3}{2}\pi a$
For rectangles (plates), $C=6$ The value of the factor $a$ in the first two of the above expressions depends on the way in which the circular-cross-section particles are packed together in the layer of particles. For "cubic packing" the value of $a$ is about 1. For "close packing" the value of $a$ is about 1.15.

Thus, for dispersions wherein the colloid particles behave as spheres arranged on the droplet surfaces in a cubic packed layer one particle thick, Equation II becomes $$D=\frac{\pi dtV}{kw} \quad \text{(Equation III)}$$

wherein the symbols have the significance previously given herein.

It is necessary that the colloidal solid particles be small relative to the droplets of oil and that the colloid be concentrated substantially at the liquid-liquid interface in a mono-layer in order for the above relationships to apply.

If the solid colloidal particles do not have nearly identical dimensions, the average effective dimension can be estimated by statistical methods. For example, the average effective diameter of spherical particles can be computed as the square root of the average of the squares of the actual diameters of the particles in a representative sample.

The fact that the droplet size becomes very uniform during limited coalescence is attributed to a tendency of the solid colloidal particles to have a stronger affinity for larger than for smaller oil droplets. This comparative affinity is analogous to an adsorption phenomenon expressed by the relationship $$Ln\frac{Sr}{S}=\frac{2\sigma M}{dRTr} \quad \text{(Equation IV)}$$

where $Sr$ is the escaping tendency of a particle from a surface of radius $r$ (e.g., the radius of a droplet)
$S$ is the escaping tendency from a flat surface
$\sigma$ is the interfacial tension
$M$ is the molecular weight of the adsorbed particle
$d$ is the density of the adsorbed particle
$RT$ are the gas constant and the absolute temperature Extension of the adsorption theory to the phenomenon of limited coalescence accords with the observation that the "escaping" tendency of the solid colloidal particles from the smaller droplets is greater than from the larger droplets, thus making the larger droplets more stable. The smaller droplets are correspondingly less stable to coalescence, thereby leading to further coalescence of the smaller droplets and the formation of droplets having very uniform and limited maximum size. This adsorption theory also predicts that the solid colloidal particle should have a very high "molecular weight." In the adsorption equation (Equation IV), the variation of escaping tendency with variations in radius of adsorption surface ($r$) is directly proportional to $M$, the molecular weight of the adsorbed particle. When the value of $r$ is large, as it is in visible droplets, the value of $M$ must also be large. Thus, for droplets of radius in the order of 0.1 cm., the value of "molecular weight" of the solid particle would have to be from about $10^6$ to $10^8$ or larger in order for the affinity of the solid particles for larger droplets to be appreciably greater than for smaller droplets. The value of from $10^6$ to $10^8$ for the "molecular weight" of the absorbed solid colloid particle is in agreement with the value of 0.1 micron ($10^{-5}$ cm.) hereinbefore given as the minimum value of the range of dimensions of suitable solid colloid particles. Obviously, in many instances, the solid colloid particle is not a single molecule and in such instances the "molecular weight" of the solid colloid particle is the sum of the molecular weights of its component molecules. The larger is the size of the solid colloid particle, within the stated range, the more the affinity of that particle for the oil droplet depends on the radius of curvature of the surface of the droplet and the more narrow is the droplet size distribution in the stable, limitedly coalesced dispersion, i.e., the more uniform is the size of the oil droplets and the polymer globules, other things being equal.

Polymer beads or globules having a particular size can be prepared by this method by preparing a dispersion of droplets of monomeric polymerizable liquids having a corresponding particular size. If the values required by Equation II are known or determinable, namely the dry density, the swelling ratio, the average effective thickness of the solid colloid particles and the manner of their distribution on the droplet surface, then the weight thereof required to prepare specific, desired sized droplets of monomer liquid in a given recipe can be readily computed. However, the present method can be employed to advantage even if such values are not known. In such instances, a simple preliminary test can be carried out in which a known volume of a polymerizable liquid is vigorously agitated with an aqueous suspending medium containing a known but arbitrarily selected quantity of a solid colloidal material capable of producing limited coalescence of the dispersed droplets. After such vigorous agitation and after a period of quiescence, the average diameter of the resulting stable droplets can be determined. This test establishes the relationship between the average diameter of the dispersed droplets and the weight of the solid colloidal material in the recipe. From this preliminarily established relationship, the weight of such colloid required to prepare droplets of such monomer having a different average diameter can readily be determined since the average diameter of the stable droplets is inversely proportional to the weight of solid colloid, other things being equal. Algebraically, this can be stated as $$D_1w_1=D_2w_2=D_3w_3 \text{ etc.}$$

where the symbols $D$ and $w$ have meanings as before stated.

Having been prepared in the manner described above, the droplets are substantially stable against further coalescence but usually tend either to rise or to sink in the aqueous medium according to whether the density of the oil droplets is less than, or greater than, the density of the aqueous medium. If desired, the stable coalesced dispersion can be allowed to "cream," i.e., to undergo a concentration of the dispersed phase by gravitational separation from a part of the suspending medium. A part of the aqueous suspending medium can then be withdrawn, for example by decantation, leaving a more concentrated dispersion having a greater portion of polymerizable monomer liquid relative to the aqueous suspension medium.

The method of this invention comprises the feature of treating the uniform droplet suspension prepared as described above to render the suspension stable against congregation of the oil droplets.

This further stabilization is accomplished by gently admixing with the uniform droplet dispersion an agent capable of greatly increasing the viscosity of the aqueous liquid. For this purpose there may be used any water-soluble or water-dispersible thickening agent that is insoluble in the oil droplets and that does not remove the layer of solid colloidal particles covering the surface of the oil droplets at the oil-water interface. Examples of suitable thickening agents are sulfonated polystyrenes (water-dispersible, thickening grade), hydrophilic clays such as bentonite, digested starch, natural gums, carboxysubstituted cellulose ethers and the like. Preferably, the thickening agent is selected and employed in such quantities as to form a thixotropic gel in which are suspended the uniform-sized droplets of the oil. In other words, the thickened liquid should be non-Newtonian in its fluid behavior, i.e., of such a nature as to prevent movement of the dispersed droplets within the aqueous liquid by the action of gravitational force due to difference in density of the phases. The stress exerted on the surrounding medium by a suspended droplet is not sufficient to cause movement of the droplet within such non-Newtonian media. Usually, the thickener agents are employed in such proportions relative to the aqueous liquid that the apparent viscosity of the thickened aqueous liquid is in the order of at least 500 centipoises (usually determined by means of a Brookfield viscosimeter using the No. 2 spindle at 30 r.p.m.). The thickening agent is preferably prepared as a separate concentrated aqueous composition that is then carefully blended with the oil droplet dispersion.

The resulting thickened dispersion is capable of being handled, e.g., passed through pipes, and can be subjected to polymerization conditions substantially without mechanical change in the size or shape of the dispersed oil droplets.

The resulting dispersions are particularly well suited for use in continuous polymerization procedures that can be carried out in coils, tubes and elongated vessels adapted for continuously introducing the thickened dispersions into one end and for continuously withdrawing the mass of polymer beads from the other end. The polymerization step can also be practiced in batch manner.

Suspension polymerization of water-insoluble polymerizable ethylenically unsaturated vinylidene compounds in thickened aqueous media is the subject of copending applications, Serial Numbers 451,681, 451,682, 451,683 and 451,684, all filed August 23, 1954.

Polymerization of the polymerizable liquid contained in the uniform-sized oil droplets dispersed in the thickened aqueous suspension medium as just described can be effected by subjecting the dispersion to conditions conducive to polymerization. Usually this is done by raising the temperature of the dispersion until polymerization of the polymerizable material is initiated and by maintaining those conditions until the polymerization is substantially complete. No agitation is required to maintain the polymerizing oil droplets in dispersed condition or to prevent their settling or rising in the suspending medium, although gentle agitation can be employed to assist in heat transfer. Because the droplets are held apart from one another during the polymerization without being subjected to mechanical stresses, the droplets retain their spheroidal shape. The resulting polymer beads are also nicely spheroidal, often almost perfectly spherical, and are substantially free of misshapen beads such as are often obtained when agitation is employed during polymerization. The beads are also free of adhesion to one another such as is often obtained in previous methods when the polymerizing globules were allowed to pack too closely together.

After the polymerization is substantially complete, the polymer beads can be collected, separated from the suspending medium, washed and otherwise treated in ways already known in this art.

The present improved procedure of suspension polymerization can be carried out with any polymerizable liquid material that is not soluble or self-emulsifiable in the aqueous suspending medium and that contains at least one polymerizable organic compound that polymerizes by the mechanism known as addition polymerization. Most polymerizable vinylidene compounds meet these requirements. Examples of typical suitable monomeric compounds that are substantially water-insoluble, polymerizable, and ethylenically unsaturated include the alkenyl- aromatic compounds such as the styrene compounds and alkenylaliphatic compounds such as vinyl and vinylidene halides and esters of acrylic and methacrylic acids. Mixtures of two or more polymerizable materials can be used. The polymerizable liquid can also contain non-polymerizable ingredients dissolved or dispersed therein, such as plasticizers and/or preformed polymeric material of a kind that is the same as, or different from, the monomeric ingredient, provided that the resulting mixture exhibits liquid behavior and is not soluble or self-emulsifiable in the aqueous suspending medium and provided that the monomeric ingredient is polymerizable in the mixture. Monomer-soluble, water-insoluble catalysts, such as benzoyl peroxide, can be employed to activate the polymerization and are preferably dispersed in the monomer liquid starting material prior to its dispersion in the aqueous suspending medium.

The following examples illustrate ways in which the invention has been practiced but should not be construed as limiting its scope.

EXAMPLE 1

In a series of tests, identified as Tests 1 through 4, various monomeric materials were polymerized in suspension in aqueous media according to the method of this invention. In each test, 5 ccs. of a liquid monomeric material and 5 ccs. of an aqueous suspending medium were admixed and vigorously agitated in a vessel whose capacity was about 16 ccs. to form a dispersion of very small droplets of the monomeric liquid in the aqueous liquid medium. The compositions of the monomeric liquid materials used in the tests were as follows:

Tests 1, 3 and 4=90 parts by weight styrene, 10 parts by weight divinylbenzene and 0.5 percent by weight benzoyl peroxide.

Test 2=90 parts by weight p-(chloromethyl)styrene, 10 parts by weight divinylbenzene and 0.5 percent by weight benzoyl peroxide.

The aqueous suspending medium employed in each test contained water, bentonite clay, a promoter and 0.02 percent by weight of added cupric sulfate pentahydrate. The cupric sulfate was added for the dual purpose of providing a polyvalent cation effective in causing gelation of the thickener added later and also effective in inhibiting polymerization of the monomers in the aqueous phase. The promoter used was a water-soluble condensation product of equimolar proportions of diethanol amine and adipic acid. The bentonite clay dispersion was prepared by vigorous agitation by means of a mechanical stirrer of a water suspension of the clay. The amounts of bentonite and of promoter contained in the 5 ccs. of aqueous medium used in each test were as follows:

| Test | Bentonite Weight in Grams | Promoter Weight in Grams |
|---|---|---|
| 1 | 0.00025 | 0.0015 |
| 2 | 0.0005 | 0.002 |
| 3 | 0.001 | 0.0014 |
| 4 | 0.002 | 0.0018 |

After the 5 ccs. of monomer mixture had been intimately dispersed into the 5 ccs. of the corresponding aqueous suspending medium for each test, the resulting dispersions were allowed to rest without agitation for about a minute, during which a limited coalescence of the dispersed droplets was observed to take place. When no further coalescence could be observed, the vessels containing the dispersions were carefully filled to overflowing by the addition thereto of a concentrated bentonite clay dispersion prepared by subjecting a 3 percent by weight slurry of bentonite clay in water to very vigorous agitation, by means of a mechanical stirrer. The vessels were then closed, tumbled by hand thoroughly to mix the dispersed droplets into the aqueous medium, the apparent viscosity of which increased as mixing proceeded. The vessels were then placed in a water bath at a temperature of 84° C. for twenty hours. The resulting polymer beads were collected on a fine-mesh screen, washed with water and dried. Photomicrographs were taken of the polymer beads obtained in each test. From these photomicrographs, the diameters of all the beads in a typical area containing twenty-five beads were determined for each test and statistically treated to calculate the numerical average diameter, the standard deviation (the square root of the average of the squares of the deviations of the diameter of the individual beads from the average diameter) and the coefficient of variation (the ratio of the standard deviation to the average diameter). These data are summarized in Table I wherein are shown the test numbers corresponding to those already described herein, the weight in grams of bentonite employed in each test, and the average diameter in centimeters, and the coefficient of variation of the diameters of the beads of polymer that were obtained in each test. The table also shows the predicted diameter in centimeters of the polymer beads as the value of D computed from the equation $$D = \frac{\pi d t V}{k w}$$

wherein, for bentonite clay prepared as described, the value of $d$ is taken as 2.1 grams per cc., the value of $t$ was determined to be about $1.2 \times 10^{-5}$ cm., the value of $V$ is 5 ccs., the value of $k$ is taken as 8 and the value of $w$ (weight of bentonite in grams) is as herein shown for each test.

For purposes of contrast, similar data are shown for the diameters of polymer beads made by a suspension polymerization in the usual manner of a comonomer mixture of styrene and divinylbenzene using controlled agitation and an aqueous suspending medium containing methoxycellulose as the granulating agent ("control" test in Table I).

Table I

| Test Number | Bentonite Weight in Grams | Polymer Bead Diameter, in Cms. | | |
|---|---|---|---|---|
| | | Predicted | Observed Average | Coefficient of Variation |
| 1 | 0.00025 | 0.2 | 0.15 | 0.206 |
| 2 | 0.0005 | 0.1 | 0.105 | 0.15 |
| 3 | 0.001 | 0.05 | 0.058 | 0.114 |
| 4 | 0.002 | 0.025 | 0.026 | 0.245 |
| Control | none | | 0.041 | 0.44 |

It will be seen from Table I that the average diameters of the polymer beads obtained in the several tests of the method of this invention were approximately the values predicted by the composition of the aqueous medium in which a limited coalescence of the dispersed monomer liquid was caused to occur. Furthermore, it will be seen from the values of the coefficient of variation of the individual bead diameters that the range of sizes obtained in practice of the present method is much narrower than that obtained by the usual method of suspension polymerization using controlled agitation and an aqueous suspending medium containing a granulating agent.

EXAMPLE 2

In a manner similar to that described in Example 1 styrene and divinylbenzene were copolymerized while suspended in an aqueous liquid medium.

The monomeric liquid contained 90 parts by weight styrene, 10 parts by weight divinylbenzene, and 0.5 percent by weight benzoyl peroxide.

The aqueous liquid suspending medium for obtaining uniform sized droplets of the polymerizable liquid by limited coalescence contained 5 ccs. water, about 0.05 gram rice starch and 0.02 percent by weight cupric sulfate pentahydrate.

The 5 ccs. of aqueous suspending medium and 5 ccs. of the monomeric liquid were admixed and vigorously agitated in a vessel having a total capacity of about 16 ccs. to form a dispersion of very small droplets of the monomer liquid in the aqueous liquid. When the dispersion was allowed to stand quietly, limited coalescence of the dispersed droplets occurred with formation of a lesser number of larger droplets of very uniform size. The vessel containing the uniform-sized droplet dispersion was then filled with another portion of the concentrated (3 percent by weight) bentonite clay dispersion described in Example 1. The full vessel was capped and the contents were gently but thoroughly mixed by tumbling the vessel, whereby the liquid droplets were dispersed without subdivision in the aqueous medium that became more viscous as the added thickener was mixed therewith. The vessel was then placed in a water bath at a temperature of 84° C. for twenty hours. The resulting polymer beads were collected on a fine mesh screen, separated from the aqueous suspending medium, washed with water and dried. From a photomicrograph, the diameters of the polymer beads in a typical group of 15 beads were measured and averaged. Statistical computations were made in a manner described in Example 1. The data are shown in Table II.

Table II

| Rice Starch Weight in Grams | Polymer Bead Diameter in Cms. | |
|---|---|---|
| | Observed Average | Coefficient of Variation |
| 0.05 | 0.250 | 0.173 |

EXAMPLE 3

Styrene was polymerized in suspension using an ion exchange resin in the form of very small beads as the solid colloid for obtaining uniform droplet size by limited coalescence. The ion exchange resin was a sulfonated styrene-divinylbenzene copolymer resin in the cupric ion form and in the shape of very small spheroidal beads capable of passing through a 400-mesh standard sieve screen. An aqueous suspending medium was prepared containing 5 ccs. water, 0.3 gram of the ion exchange resin as the limited coalescence solid colloid and 0.0003 gram of a water-soluble resinous condensation product of ethylene oxide, urea and formaldehyde as a promoter. The 5 ccs. of aqueous medium and 5 ccs. of styrene containing 0.2 percent by weight benzoyl peroxide were admixed and the oil was finely dispersed into aqueous liquid by very vigorous agitation. Upon standing without agitation, the dispersion underwent a limited coalescence with the formation of a lesser number of larger and very uniform oil droplets each covered with a brown film (ion exchange resin) suspended in a clear aqueous medium. The vessel containing the uniform-sized droplet dispersion was carefully filled by adding about 5 ccs. of the concentrated (3% by weight) dispersion of bentonite clay that was described in Example 1. The vessel was capped and the contents were gently mixed whereupon the apparent viscosity of the aqueous liquid greatly increased. The vessel was placed in a water bath and held at a temperature of 84° C. for 20 hours. The resulting polymer beads were collected on a fine-mesh screen, washed with water and dried. From a photomicrograph, the diameters of the polymer beads in a typical group of ten beads were measured and averaged and statistical computations were made in a manner described in Example 1. The data are shown in Table III.

Table III

| Ion Exchange Resin, Weight in Grams | Polymer Bead Diameter in Cms. | |
|---|---|---|
| | Observed Average | Coefficient of Variation |
| 0.3 | 0.303 | 0.125 |

In order to test Equation II, styrene monomer was suspended in an aqueous medium containing solid colloids having known sizes. To obtain spherical colloidal particles of known diameter, a sample of a sulfonated crosslinked styrene-divinylbenzene ion-exchange resin in the acid form and capable of passing through a standard 400 mesh sieve screen was fractionated by repeated sedimentation and decantation in 25 percent by weight ethyl alcohol. Four fractions were obtained. The range of particle diameters and the average diameter in each fraction, as estimated by visual examination at 300 power magnification under a microscope, were as follows:

| Fraction Number | Particle Diameter, Centimeters × 10⁻⁴ | |
|---|---|---|
| | Range | Average |
| 1 | 4.8 to 18 | 9 |
| 2 | 9 to 20 | 13.5 |
| 3 | 13.5 to 30 | 20 |
| 4 | 22 to 45 | 31 |

Using Equation II and assuming the value of $C$ to be the value of $\pi$, the value of $d$ to be 1.44 grams per cubic centimeter and the value of $k$ to be 1.2, the weight in grams of each of the four fractions of colloid, having average diameters as just shown, that would be necessary for a total oil volume of 5 cubic centimeters to make droplets having diameters of 0.1 centimeter was computed as follows:

Fraction number:                  Weight in grams
1 — 0.168
2 — 0.255
3 — 0.376
4 — 0.58

Accordingly, 7-cc. portions of aqueous material were prepared, each containing an amount of one of the resin fractions corresponding to the weights just shown, and also containing 0.4 percent by weight calcium chloride and 0.0024 percent by weight gelatin as promoters.

To each of these aqueous compositions was added 5 ccs. of monomeric styrene and the resulting mixtures were thoroughly shaken to cause dispersion of the oil into the aqueous medium. The dispersions were then allowed to stand quietly for about a minute during which a limited coalescence occurred. The average diameter of the resulting stable droplets of styrene monomer in each case is shown in Table IV.

Table IV

| Fraction Number | Colloid Size, Cms. × 10⁻⁴ | Weight of Colloid, gms. | Average Diameter of Droplets, Cms. | |
|---|---|---|---|---|
| | | | Predicted | Observed |
| 1 | 9 | 0.168 | 0.1 | 0.11 |
| 2 | 13.5 | 0.255 | 0.1 | 0.10 |
| 3 | 20 | 0.376 | 0.1 | 0.08 |
| 4 | 31 | 0.58 | 0.1 | 0.08 |

Dispersions of stable droplets having average diameters in the range of from about 0.01 or less up to about 0.5 centimeter can be prepared in similar manner. These dispersions can then be thickened and polymerized in a manner described in other of these examples.

EXAMPLE 4

Bentonite clay was employed as the solid colloid to obtain uniform droplets of vinylidene chloride by limited coalescence. In a series of tests identified as 8 through 10, separate 5-cc. portions of vinylidene chloride, each containing 0.2 percent by weight benzoyl peroxide, were vigorously dispersed into 5-cc. portions of aqueous suspending medium in vessels each having a total capacity of about 16 ccs. The aqueous media in each test contained 0.02 percent by weight cupric sulfate pentahydrate and quantities of bentonite and of promoter (a water-soluble condensation product of equimolar proportions of diethanol amine and adipic acid) as follows:

| Test | Bentonite, Grams | Promoter, Grams |
|---|---|---|
| 8 | 0.0005 | 0.0005 |
| 9 | 0.001 | 0.001 |
| 10 | 0.002 | 0.002 |

The bentonite dispersions had been prepared by violent agitation by means of a mechanical stirrer of slurries of bentonite in water.

The dispersions were allowed to rest without agitation for a few seconds until a limited degree of coalescence had taken place with formation of stable, uniform droplets of oil in the dispersion of each test. The size of the droplets was smallest in Test 10 and largest in Test 8. The vessels containing the dispersions were then filled with approximately 5-cc. portions of the 3 percent by weight bentonite clay dispersion described in Example 1. The vessels were capped and the contents were gently mixed by tumbling the vessels, whereby the viscosities of the aqueous suspending media were greatly increased. The vessels were placed in a water bath at a temperature of 60° C. for twenty hours. The resulting polymer beads were collected, washed and dried. From photomicrographs, the average diameters of the beads in a typical group of 25 beads were determined for each test and statistical computations were made therefrom. These data are shown in Table V.

Table V

| Test Number | Bentonite Weight in Grams | Polymer Bead Diameters in Cm. | |
|---|---|---|---|
| | | Observed Average | Coefficient of Variation |
| 8 | 0.0005 | 0.066 | 0.139 |
| 9 | 0.001 | 0.035 | 0.25 |
| 10 | 0.002 | 0.018 | 0.23 |

The data in Table V show that the average diameter of the polymer beads is inversely proportional to the weight of solid colloid (bentonite) employed in the aqueous suspending medium in which limited coalescence was permitted to occur and that the range of diameters of beads in a particular test was very narrow.

I claim:

1. In a process of making solid polymeric bodies in the form of spheroidal globules having substantially uniform size by forming a suspension of small droplets of a polymerizable liquid in an aqueous non-solvent liquid medium and polymerizing the polymerizable liquid in such suspension by subjecting the same to conditions conducive to polymerization without turbulence whereby the suspended droplets of polymerizable liquid are converted to globules of polymer having approximately the same size and shape as those of the suspended droplets, the improvement that comprises making a suspension of droplets of a polymerizable liquid in an aqueous non-solvent medium by forming a mixture that comprises one part by volume of a polymerizable organic liquid comprising at least one vinylidene compound capable of polymerizing by addition and selected from the class consisting of alkenylaromatic hydrocarbons, p-(chloromethyl)-styrene, and vinylidene chloride and at least 0.5 part by volume of an aqueous non-solvent liquid medium which comprises a water-insoluble, hydrophilic, colloidal solid particle emulsifier capable of stabilizing an oil-in-water suspension and selected from the class consisting of water-insoluble, hydrophilic, colloidal solid particles of hydrous mineral oxides, sulfonated crosslinked polystyrene resins, and raw starches, the colloidal solid particle emulsifier being present in amount corresponding to from 0.01 to 10 grams per 100 cubic centimeters of the polymerizable liquid, mechanically agitating the mixture to disperse the polymerizable liquid, as smaller-than-stable droplets, in the non-solvent liquid medium, and bringing the resulting unstable dispersion to a condition of quiescence, whereby the unstable droplets undergo a limited coalescence to form a stable suspension of droplets having substantially uniform size, and thereafter polymerizing the droplets with a peroxy catalyst.

2. The improvement according to claim 1 wherein the polymerizable liquid comprises an alkenylaromatic hydrocarbon.

3. The improvement according to claim 1 wherein the polymerizable liquid comprises vinylidene chloride.

4. The improvement according to claim 1 wherein the colloidal solid particle emulsifier is bentonite clay.

5. The improvement according to claim 1 wherein the polymerizable liquid comprises styrene and the colloidal solid particle emulsifier is a raw starch.

6. The improvement according to claim 1 wherein the polymerizable liquid comprises styrene and the colloidal solid particle emulsifier is bentonite clay.

References Cited in the file of this patent

UNITED STATES PATENTS

| | | |
|---|---|---|
| 2,566,567 | Hutchinson et al. | Sept. 4, 1951 |
| 2,701,245 | Lynn | Feb. 1, 1955 |

OTHER REFERENCES

Schildknecht: "Polymer Processes," pages 72–81 (1956). Copy in Pat. Off. Sci. Lib.